(12) United States Patent
Chow

(10) Patent No.: US 7,008,057 B1
(45) Date of Patent: Mar. 7, 2006

(54) CLIP FOR HOLDING AND AUXILIARY EYEGLASS UNIT ON A PRIMARY EYEGLASS UNIT

(75) Inventor: Sheng-Tang Chow, Taipei (TW)

(73) Assignee: Evergreat Optical Ind. Co., Ltd., Taipei (TW)

( * ) Notice: Subject to any disclaimer, the term of this patent is extended or adjusted under 35 U.S.C. 154(b) by 0 days.

(21) Appl. No.: 11/032,351

(22) Filed: Jan. 10, 2005

(30) Foreign Application Priority Data

Nov. 1, 2004 (TW) .............................. 93217439 U

(51) Int. Cl.
G02C 9/00 (2006.01)
A44B 21/00 (2006.01)

(52) U.S. Cl. .............................. 351/47; 24/3.3; 24/3.7; 24/3.8

(58) Field of Classification Search .................. 351/47, 351/48, 57, 58, 44, 41, 158; 24/3.3, 3.7, 24/3.8
See application file for complete search history.

(56) References Cited

U.S. PATENT DOCUMENTS

| | | | |
|---|---|---|---|
| 6,089,708 A * | 7/2000 | Ku | 351/47 |
| 6,264,323 B1 * | 7/2001 | Chao | 351/47 |
| 6,280,029 B1 | 8/2001 | Salk | 381/47 |
| 6,799,846 B1 * | 10/2004 | Chow | 351/47 |

* cited by examiner

Primary Examiner—Hung Xuan Dang
(74) Attorney, Agent, or Firm—Frommer Lawrence & Haug LLP; Ronald R. Santucci

(57) ABSTRACT

A clip for holding an auxiliary eyeglass unit on a primary eyeglass unit includes a retaining member and a supporting member. The retaining member includes an upright front plate, an upright intermediate plate unit, and a horizontal top plate interconnecting upper ends of the front plate and the intermediate plate unit. An upper end of the auxiliary eyeglass unit is disposed among the front plate, the intermediate plate unit and the top plate. Front and rear projection units are formed respectively on the front plate and the intermediate plate unit, and perforate into the auxiliary eyeglass unit. The supporting member includes an upright rear plate and a horizontal connecting plate interconnecting the intermediate plate unit and the rear plate. An upper end of the primary eyeglass unit is received fittingly within a space defined by the intermediate plate unit, the rear plate and the connecting plate.

7 Claims, 4 Drawing Sheets

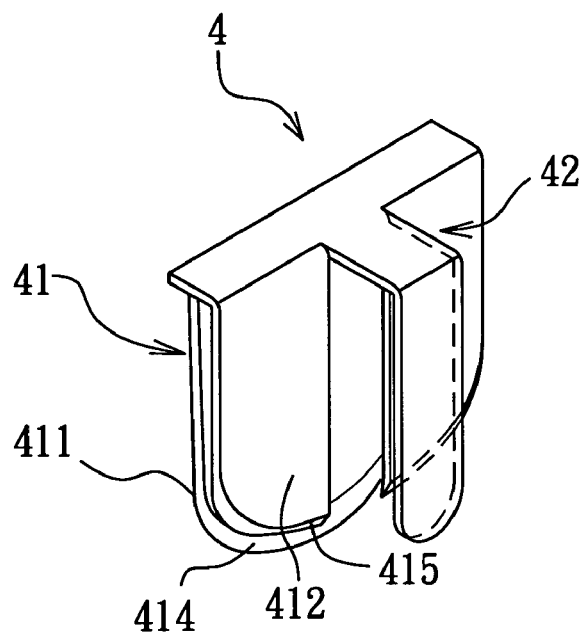
F I G. 4
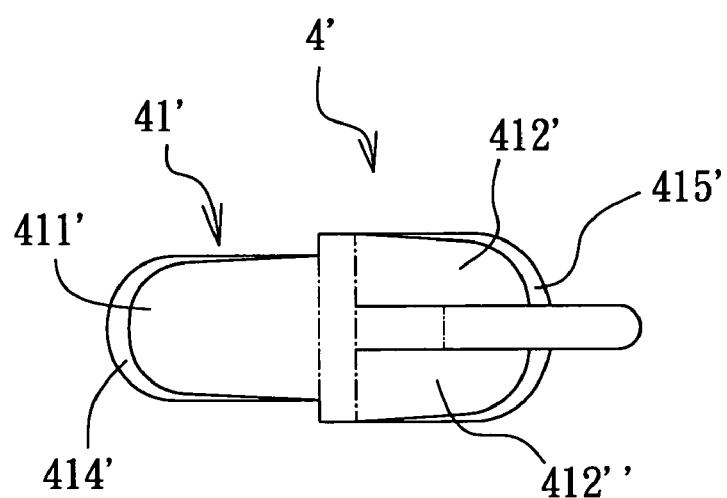
F I G. 5

CLIP FOR HOLDING AND AUXILIARY EYEGLASS UNIT ON A PRIMARY EYEGLASS UNIT

CROSS-REFERENCE TO RELATED APPLICATION

This application claims priority of Taiwanese Application No. 093217439, filed on Nov. 1, 2004.

BACKGROUND OF THE INVENTION

1. Field of the Invention

This invention relates to a clip, and more particularly to a clip that holds an auxiliary eyeglass unit on a primary eyeglass unit.

2. Description of the Related Art

U.S. Pat. No. 6,280,029 discloses a customized clip-on accessory for spectacles that is provided with a clasp. The clasp includes a channel portion for receiving an edge portion of an auxiliary eyeglass unit, a bracket portion engaging a primary eyeglass unit, and a U-shaped portion interconnecting the channel portion and the bracket portion. The distance between the primary and auxiliary eyeglass units is relatively large due to the presence of the U-shaped portion therebetween. This mars the appearance of an assembly of the primary and auxiliary eyeglass units. Furthermore, light is capable of entering lenses of the primary eyeglass unit through a space between the primary and auxiliary eyeglass units. Therefore, the function of the auxiliary eyeglass unit, which is mounted to the primary eyeglass unit with such a space formed therebetween, is reduced.

SUMMARY OF THE INVENTION

The object of this invention is to provide a clip for holding an auxiliary eyeglass unit on a primary eyeglass unit, which can reduce the distance between the primary and auxiliary eyeglass units. According to this invention, a clip for holding an auxiliary eyeglass unit on a primary eyeglass unit includes a retaining member and a supporting member. The retaining member includes an upright front plate, an upright intermediate plate unit and a horizontal top plate. The intermediate plate unit is disposed behind and parallel to the front plate. The top plate has front and rear sides that are formed respectively and integrally with upper ends of the front plate and the intermediate plate unit to define a front receiving space among the front plate, the intermediate plate unit and the top plate. The front receiving space is adapted to receive an upper end of the auxiliary eyeglass unit fittingly. The front plate and the intermediate plate unit are formed respectively with front and rear projection units that are adapted to perforate respectively into front and rear sides of the auxiliary eyeglass unit so as to retain the auxiliary eyeglass unit on the retaining member. The supporting member includes an upright rear plate and a horizontal connecting plate. The rear plate is disposed behind and parallel to the intermediate plate unit. The connecting plate has a front side connected fixedly to the top plate of the retaining member, and a rear side formed integrally with an upper end of the rear plate to define a rear receiving space among the intermediate plate unit, the rear plate and the connecting plate. The rear receiving space is adapted to receive an upper end of the primary eyeglass unit fittingly so as to position the retaining member relative to the primary eyeglass unit.

As such, the distance between the primary and auxiliary eyeglass units is approximately equal to the thickness of the intermediate plate unit, and therefore is relatively small.

BRIEF DESCRIPTION OF THE DRAWINGS

These and other features and advantages of this invention will become apparent in the following detailed description of the preferred embodiments of this invention, with reference to the accompanying drawings, in which:

FIG. 4 is a perspective view of the second preferred embodiment of a clip for holding an auxiliary eyeglass unit on a primary eyeglass unit according to this invention;

FIG. 5 is a top view of a metal plate, which can be pressed to form the second preferred embodiment.

DETAILED DESCRIPTION OF THE PREFERRED EMBODIMENTS

Figure 1:
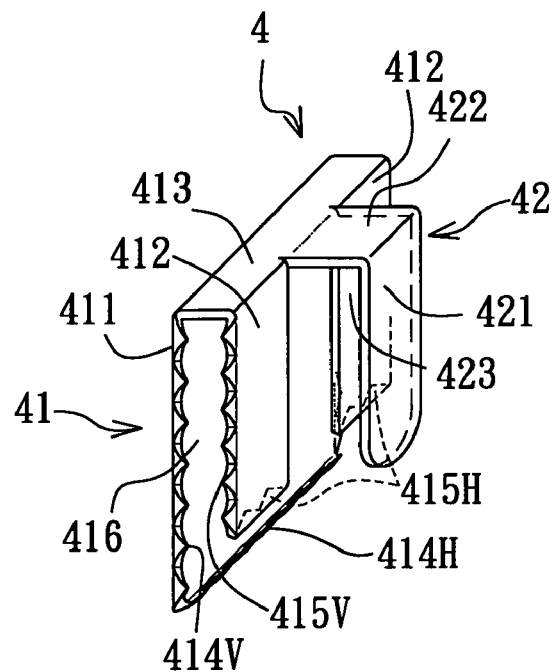
FIG. 1 is a perspective view of the first preferred embodiment of a clip for holding an auxiliary eyeglass unit on a primary eyeglass unit according to this invention.
Figure 2:
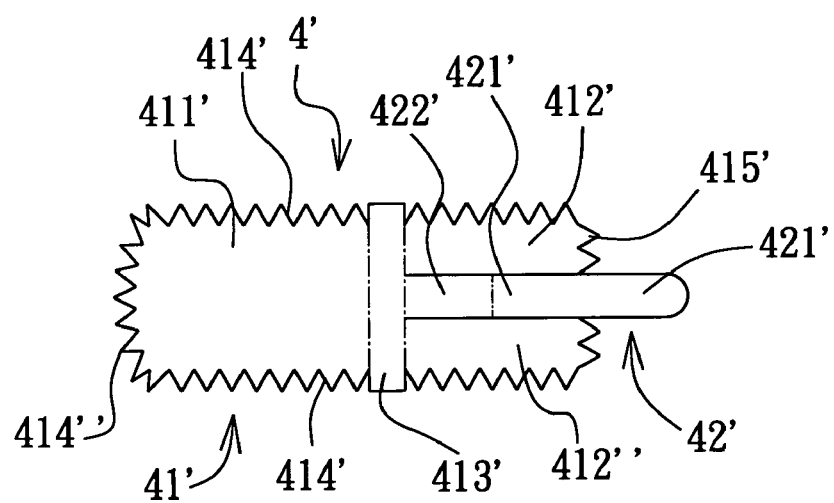
FIG. 2 is a top view of a metal plate, which can be pressed to form the first preferred embodiment.
Figure 3:
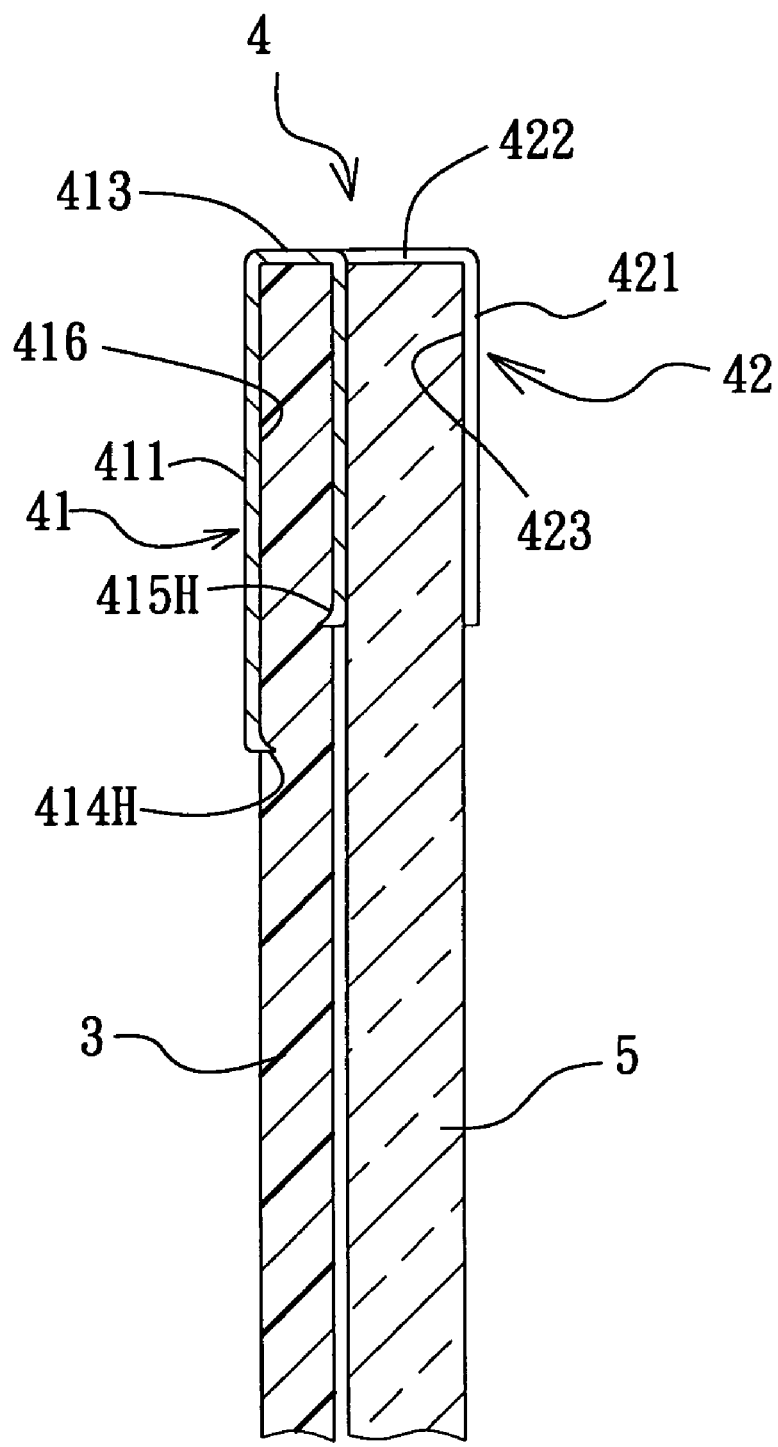
FIG. 3 is a sectional view of an assembly of the primary and auxiliary eyeglass units interconnected by the first preferred embodiment.

Before the present invention is described in greater detail in connection with the preferred embodiments, it should be noted that similar elements and structures are designated by like reference numerals throughout the entire disclosure. Referring to FIGS. 1, 2 and 3, the first preferred embodiment of a clip 4 for holding an auxiliary eyeglass unit 3 on a primary eyeglass unit 5 according to this invention is shown to include a retaining member 41 and a supporting member 42. The clip 4 is formed from a metal plate 4' shown in FIG. 2. The metal plate 4' is pressed by a pressing machine (not shown) to form the structure shown in FIG. 1.

The retaining member 41 includes an upright front plate 411, an upright intermediate plate unit consisting of a pair of coplanar upright left and right intermediate plates 412, and a horizontal top plate 413. The left and right intermediate plates 412 are disposed behind and parallel to the front plate 411, and are spaced apart from each other. Each of the left and right intermediate plates 412 has a lower end that is disposed above that of the front plate 411. The top plate 413 has a front side formed integrally with an upper end of the front plate 411, and a rear side formed integrally with upper ends of the left and right intermediate plates 412. A front receiving space 416 is defined by the front plate 411, the left and right intermediate plates 412 and the top plate 413, and receives an upper end of the auxiliary eyeglass unit 3 fittingly.

The front plate 411 has vertical left and right sides that are formed respectively with two vertical rows of teeth (414V), and a horizontal bottom side that is formed with a horizontal row of teeth (414H). The teeth (414V, 414H) perforate into a front side of the auxiliary eyeglass unit 3, and constitute a front projection unit. Each of a left side of the left intermediate plate 412 and a right side of the right intermediate plate 412 is formed with a vertical row of teeth (415V). Each of the left and right intermediate plates 412 has a horizontal bottom side that is formed with a horizontal row of teeth (415H). The teeth (415V, 415H) perforate into a rear side of the auxiliary eyeglass unit, and constitute a rear projection unit. Therefore, the auxiliary eyeglass unit 3 is retained on the retaining member 41.

The supporting member 42 is disposed between the left and right intermediate plates 412, and includes an upright rear plate 421 and a horizontal connecting plate 422. The rear plate 421 is disposed behind and parallel to the left and right intermediate plates 412. The connecting plate 422 has a front side formed integrally with the top plate 413 of the retaining member 41, and a rear side formed integrally with an upper end of the rear plate 421. Therefore, a rear receiving space 423 is defined by the left and right intermediate plates 412, the rear plate 421 and the connecting plate 422, and receives an upper end of the primary eyeglass unit 5 fittingly. As such, the retaining member 41 is positioned relative to the primary eyeglass unit 5. The rear plate 421 has a length approximately equal to that of the left and right intermediate plates 412 so as to position the upper end of the primary eyeglass unit 5 effectively within the rear receiving space 423.

The left side of the left intermediate plate 412 is aligned with the left side of the front plate 411. The right side of the right intermediate plate 412 is aligned with the right side of the front plate 411. The teeth (415V) on the left side of the left intermediate plate 412 are staggered with respect to the teeth (414V) on the left side of the front plate 411. The teeth (415V) on the right side of the right intermediate plate 412 are staggered with respect to the teeth (414V) on the right side of the front plate 411.

The metal plate 4' has a U-shaped portion 41' defining a gap, and a tongue 42' filling the gap. The U-shaped portion 41' corresponds to the retaining member 41, and includes a left area 411', a right upper area 412', a right lower area 412" and a rectangular connecting area 413'. The left area 411' corresponds to the front plate 411. The right upper and lower areas 412', 412" correspond respectively to the right and left intermediate plates 412, and define the gap therebetween. The connecting area 413' interconnects the left area 411', the right upper area 412' and the right lower area 412", and corresponds to the top plate 413. The left area 411' has upper and lower sides that are formed with teeth 414' that correspond to the teeth (414V) on the left and right sides of the front plate 411, and a left side that is formed with teeth 414" that correspond to the teeth (414H) on the bottom side of the front plate 411. The tongue 42' extends rightwardly from a middle portion of the connecting area 413' of the left portion 411', and corresponds to the supporting member 42. The tongue 42' has a left area 422' corresponding to the connecting plate 422 of the supporting member 42, and a right area 421' corresponding to the rear plate 421 of the supporting member 42.

Referring to FIG. 3, the distance between the primary and auxiliary glass units 5, 3 is approximately equal to the thickness of the left and right intermediate plates 412, and therefore is relatively small. As a consequence, the object of this invention can be achieved.

FIGS. 4 and 5 show the second preferred embodiment of a clip 4 according to this invention. Unlike the previous embodiment, each of the front plate 411 as well as the left and right intermediate plates 412 is formed with a sharp blade portion 414, 415 along an outer periphery thereof. The blade portions 414, 415 substitute for the teeth (414V, 414H, 415V, 415H) (see FIG. 1) of the second preferred embodiment. Correspondingly, the metal plate 4' has sharp blade portions 414', 415' that are formed on peripheries of the left area 411', the right upper area 412' and the right lower area 412" of the retaining member 41'.

Figure 6:
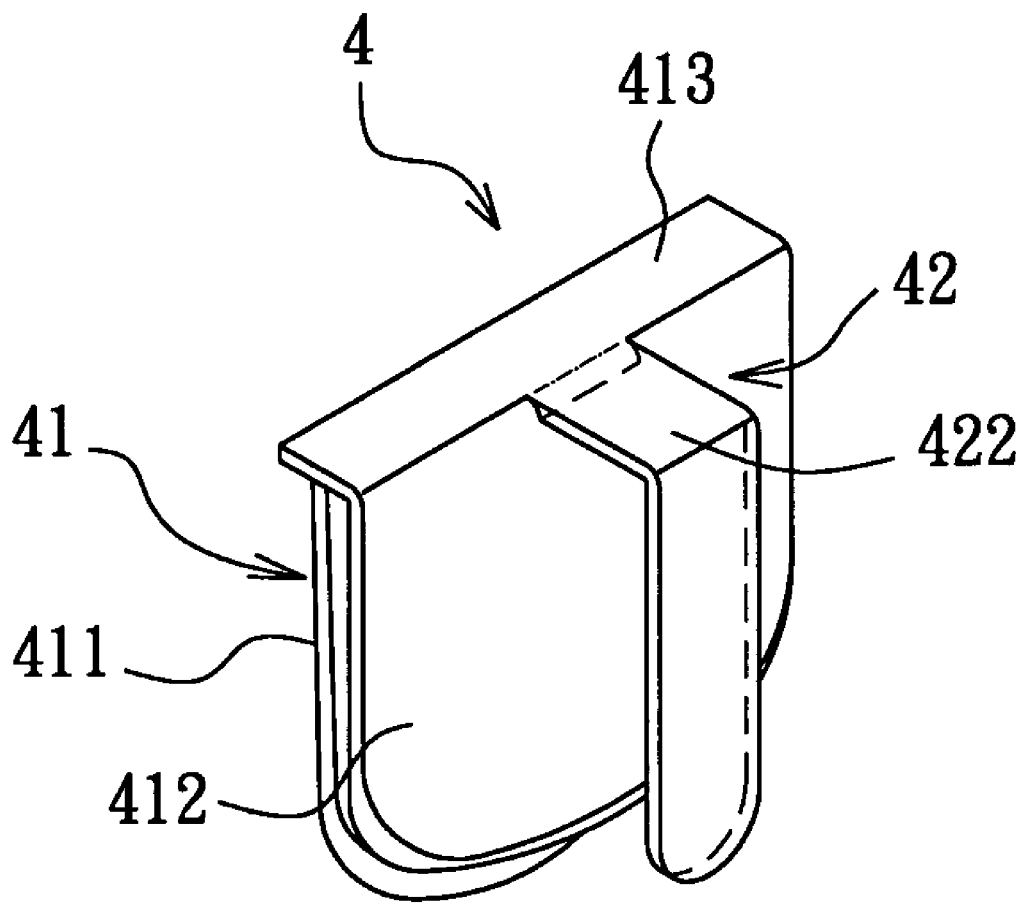
FIG. 6 is a perspective view of the third preferred embodiment of a clip for holding an auxiliary eyeglass unit on a primary eyeglass unit according to this invention.

FIG. 6 shows the third preferred embodiment of a clip 4 according to this invention, which is similar in construction to the second preferred embodiment except that the intermediate plate unit includes only one intermediate plate 412. The intermediate plate 412 has left and right sides that are aligned respectively with the left and right sides of the front plate 411. In this embodiment, the front side of the connecting plate 422 of the supporting member 42 is welded to the retaining member 41 at a junction between the top plate 413 and the intermediate plate 412.

With this invention thus explained, it is apparent that numerous modifications and variations can be made without departing from the scope and spirit of this invention. It is therefore intended that this invention be limited only as indicated by the appended claims.

I claim:

1. A clip for holding an auxiliary eyeglass unit on a primary eyeglass unit, said clip comprising:
   a retaining member including
   an upright front plate,
   an upright intermediate plate unit disposed behind and parallel to said front plate, and
   a horizontal top plate having front and rear sides that are formed respectively and integrally with upper ends of said front plate and said intermediate plate unit to define a front receiving space among said front plate, said intermediate plate unit and said top plate, said front receiving space being adapted to receive an upper end of the auxiliary eyeglass unit fittingly, said front plate and said intermediate plate unit being formed respectively with front and rear projection units that are adapted to perforate respectively into front and rear sides of the auxiliary eyeglass unit so as to retain the auxiliary eyeglass unit on said retaining member; and
   a supporting member including
   an upright rear plate disposed behind and parallel to said intermediate plate unit, and
   a horizontal connecting plate having a front side that is connected fixedly to said top plate of said retaining member, and a rear side that is formed integrally with an upper end of said rear plate to define a rear receiving space among said intermediate plate unit, said rear plate and said connecting plate, said rear receiving space being adapted to receive an upper end of the primary eyeglass unit fittingly so as to position said retaining member relative to the primary eyeglass unit.

2. The clip as claimed in claim 1, wherein said front plate of said retaining member has vertical left and right sides that are formed respectively with two vertical rows of teeth which constitute said front projection unit, said intermediate plate unit including a pair of coplanar upright left and right intermediate plates that extend respectively and downwardly from said rear side of said top plate and that are spaced apart from each other, said left intermediate plate having a vertical left side that is aligned with said left side of said front plate and that is formed with a row of teeth which is staggered with respect to said teeth on said left side of said front plate, said right intermediate plate having a vertical right side that is aligned with said right side of said front plate and that is formed with a row of teeth which is staggered with respect to said teeth on said right side of said front plate, said teeth of said left and right intermediate plates constituting said rear projection unit, said supporting member being disposed between said left and right intermediate plates.

3. The clip as claimed in claim 2, wherein each of said front plate, and said left and right intermediate plates has a horizontal bottom side, said front projection unit further including a horizontal row of teeth that is formed on said bottom side of said front plate, said rear projections further including two horizontal rows of teeth that are formed respectively on said bottom sides of said left and right intermediate plates.

4. The clip as claimed in claim 2, wherein each of said left and right intermediate plates has a lower end that is disposed above that of said front plate.

5. The clip as claimed in claim 2, wherein said front side of said connecting plate of said supporting member is formed integrally with said top plate of said retaining member.

6. The clip as claimed in claim 2, wherein each of said front plate as well as said left and right intermediate plates is formed with a sharp blade portion along an outer periphery thereof, said blade portion of said front plate constituting said front projection unit, said blade portions of said left and right intermediate plates constituting said rear projection unit.

7. The clip as claimed in claim 1, wherein said intermediate plate unit includes an intermediate plate, each of said front and intermediate plates having left and right sides, said left and right sides of said front plate being aligned respectively with said left and right sides of said intermediate plate, said front side of said connecting plate of said supporting member being welded to said retaining member at a junction between said top plate and said intermediate plate.

* * * * *